US012729277B2

(12) United States Patent
Ucak-Astarlioglu et al.

(10) Patent No.: US 12,729,277 B2
(45) Date of Patent: Sep. 8, 2026

(54) HIGH-PERFORMANCE COMPOSITE PANEL AND MANUFACTURING METHOD

(71) Applicant: United States of America as Represented by The Secretary of the Army, Alexandria, VA (US)

(72) Inventors: Mine G. Ucak-Astarlioglu, Ridgeland, MS (US); Hayden A. Hanna, Lumberton, MS (US); Michael J. Grotke, Vicksburg, MS (US); Zackery B. McClelland, Clinton, MS (US); Robert D. Moser, Clinton, MS (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 546 days.

(21) Appl. No.: 18/110,784

(22) Filed: Feb. 16, 2023

(65) Prior Publication Data

US 2024/0279414 A1 Aug. 22, 2024

(51) Int. Cl.

| | |
|---|---|
| ***C08J 5/24*** | (2006.01) |
| ***B32B 27/12*** | (2006.01) |
| ***B32B 27/38*** | (2006.01) |
| ***C08G 59/22*** | (2006.01) |
| ***C08G 59/24*** | (2006.01) |
| ***C08G 59/50*** | (2006.01) |
| ***C08K 3/04*** | (2006.01) |
| *B29C 70/30* | (2006.01) |
| *B29K 63/00* | (2006.01) |
| *B29K 309/00* | (2006.01) |

(52) U.S. Cl.

CPC ............ *C08J 5/241* (2021.05); *C08G 59/226* (2013.01); *C08G 59/245* (2013.01); *C08G 59/502* (2013.01); *C08J 5/249* (2021.05); *C08K 3/042* (2017.05); *B29C 70/30* (2013.01); *B29K 2063/00* (2013.01); *B29K 2309/00* (2013.01); *C08J 2363/02* (2013.01); *C08K 2201/011* (2013.01)

(58) Field of Classification Search

None

See application file for complete search history.

(56) References Cited

U.S. PATENT DOCUMENTS

| | | | | |
|---|---|---|---|---|
| 2011/0305907 A1* | 12/2011 | Scheuer | ............... | C09D 163/00 427/379 |
| 2011/0319564 A1* | 12/2011 | Corley | ............... | C08G 59/5006 525/534 |
| 2015/0099834 A1* | 4/2015 | Barnell | ................. | B29C 70/443 523/468 |

* cited by examiner

*Primary Examiner* — Michael J Feely

(74) *Attorney, Agent, or Firm* — Brian C. Jones; Lawrence A. Schemmel

(57) ABSTRACT

A composite product includes basalt fibers and a liquid polymer resin mixed with a curing agent and infused into the basalt fibers. A method of making the composite product includes mixing a liquid polymer resin with a curing agent to form a resin matrix; infusing the resin matrix into basalt fibers; and curing the basalt fibers infused with the resin matrix to form the composite product. The method may further include adding an additive including at least one of graphene or graphite to the liquid polymer resin and the curing agent, and mixing the additive with them to form the resin matrix which is infused into the basalt fibers. It may further include weighing the additive, at about 0.1% to 0.3% of a weight of the liquid polymer resin and curing agent, to be added to the liquid polymer resin and curing agent.

14 Claims, 11 Drawing Sheets

Main Components
Diglycidal ether of Bisphenol F – (DGEBF) – 70%
Compound A
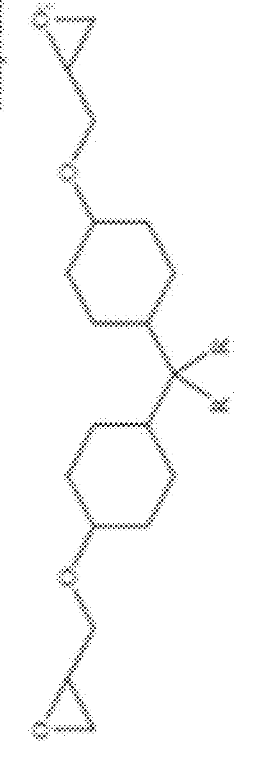
Hydrogenated DGEBF – 20%
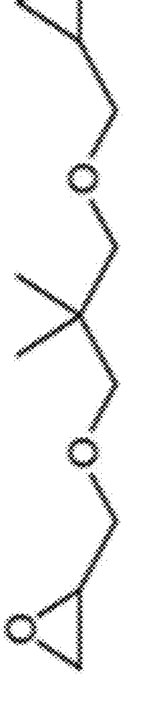
Neopentyl glycol diglycidyl ether – 10%
Curing Agent
$H_2N$ … $NH_2$
Triethylenetetramine (TETA)
FIG. 1

| Additive | Description | Grade | Supplier | Cost by weight* ($/g) |
|---|---|---|---|---|
| Graphite | fine black powder | BF-103 | XG Sciences | 1.00* |
| Graphene | black nanoplatelets | xGnP®, C-750 | Barite World | 0.025* |

*Prices as of 2022.

| Physical Properties | Basalt fiber | Glass fiber |
|---|---|---|
| Tensile Strength (MPa) | 3100 - 4840 | 2000 - 3500 |
| Modulus of Elasticity (GPa) | 85 - 95 | 70 |
| Density ($g/cm^3$) | 2.8 | 2.5 |
| Elongation at Break (%) | 3.15 | 2.5 |

FIG. 4

| Fiber | Fabric orientation | Weave pattern | Supplier | Areal weight ($oz/yd^2$) | Fiber thickness (in) | Cost by area of fabric ($\$/ft^2$) | Cost by weight of fabric ($/lb) |
|---|---|---|---|---|---|---|---|
| E-Glass | 0°, 90° | Plain | Fiber Glast Development Corp | 3.5 - 4.0 | 0.005 - 0.008 | 0.556* | 21.35* |
| Basalt | 0°, 90° | Plain | Smarter Building Systems, LLC | 4.7 | 0.0004 | 0.888** | 25.96** |

FIG. 5

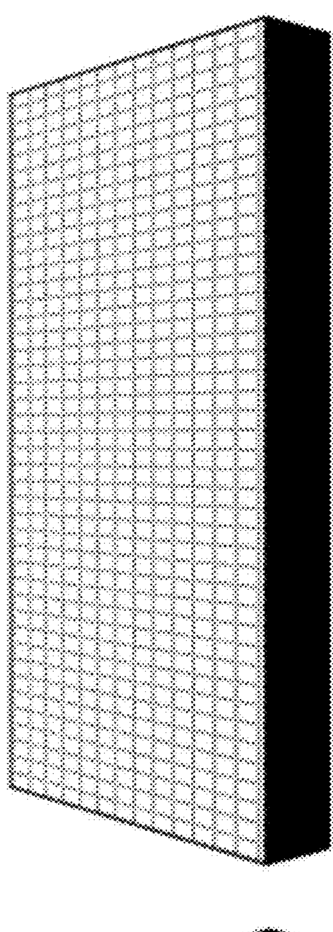
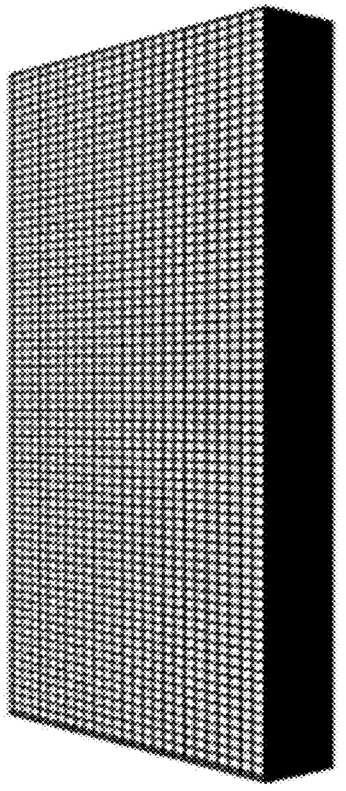
FIG. 9

| Material Composition | Flexural | | | Tensile | | |
|---|---|---|---|---|---|---|
| | Flexural Modulus (GPa) | Flexure Stress at Break (Standard) (MPa) | Percent Increase or Decrease (%) | Ultimate Tensile Strength (MPa) | Young's Modulus (GPa) | Percent Increase or Decrease (%) |
| Basalt/Pure Resin | 22.524 | 122.946 | N/A | 409.820 | 12.451 | N/A |
| Basalt/0.1% Graphite | 21.342 | 128.244 | 4 | 407.270 | 13.488 | 8 |
| Basalt/0.3% Graphite | 24.379 | 143.706 | 17 | 439.534 | 12.502 | 0 |
| Basalt/0.1% Graphene | 21.783 | 109.284 | -11 | 400.896 | 14.005 | 12 |
| Basalt/0.3% Graphene | 18.745 | 80.596 | -34 | 342.840 | 13.859 | 11 |
| E-Glass/Pure Resin | 16.143 | 60.366 | N/A | 207.639 | 10.873 | N/A |
| E-Glass/0.1% Graphite | 16.691 | 79.036 | 31 | 199.108 | 12.566 | 16 |
| E-Glass/0.3% Graphite | 17.689 | 76.072 | 26 | 176.642 | 12.423 | 14 |
| E-Glass/0.1% Graphene | 18.023 | 64.424 | 7 | 224.278 | 13.369 | 23 |
| E-Glass/0.3% Graphene | 16.669 | 70.358 | 17 | 194.368 | 12.871 | 18 |

FIG. 13

| Fiber/fabric type | Cost by fabric weight ($/lb) | Average Performance | | | |
|---|---|---|---|---|---|
| | | Flexural Modulus (GPa) | Flexure Stress at Break (Standard) (MPa) | Young's Modulus (GPa) | Ultimate Tensile Strength (MPa) |
| E-Glass | 21.35 | 17.04 | 70.05 | 12.42 | 200.41 |
| Basalt | 25.96 | 21.75 | 116.96 | 13.26 | 400.07 |
| Percent change from E-glass to basalt | 21.59% | 27.64% | 66.96% | 6.77% | 99.63% |

FIG. 14

| Composition | Cost of additive by area ($/ft$^2$) | Cost of additive by weight ($/lb) |
|---|---|---|
| Basalt/0.1% Graphite | 0.022 | 0.004 |
| Basalt/0.3% Graphite | 0.066 | 0.011 |
| E-Glass/0.1% Graphite | 0.026 | 0.003 |
| E-Glass/0.3% Graphite | 0.078 | 0.010 |
| Basalt/0.1% Graphene | 0.883 | 0.151 |
| Basalt/0.3% Graphene | 2.649 | 0.452 |
| E-Glass/0.1% Graphene | 1.039 | 0.135 |
| E-Glass/0.3% Graphene | 3.117 | 0.404 |

FIG. 15

HIGH-PERFORMANCE COMPOSITE PANEL AND MANUFACTURING METHOD

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to composite products and methods of making composite products including composite panels.

Description of the Related Art

This section introduces aspects that may help facilitate a better understanding of the invention. Accordingly, the statements of this section are to be read in this light and are not to be understood as admissions about what is prior art or what is not prior art.

A fiber-reinforced composite is a high-performance composite material made of three components: the fibers as the discontinuous or dispersed phase, the matrix as the continuous phase, and the fine interphase region or the interface. Composite panels are useful in a variety of applications including ballistics.

SUMMARY

The present invention was developed to address the desire for a composite product having high-performance impact resistance at a competitive cost. Research and development have led to novel composite products that have significantly higher strength and moduli compared to known panels such as E-Glass panels. These novel composite products are also environmentally friendly with little to no weight penalty. Such novel composite products provide an attractive lightweight alternative in shielding against projectile impacts or the like.

Embodiments of the invention employ basalt fibers in making the composite products. Basalt fiber has superior thermal insulation and fire resistance properties, making it particularly suitable as a high-resistant material for industrial applications. In addition, its strength, impact resistance, and chemical alertness are attractive for composite applications. Basalt fiber combined with additives such as carbonaceous materials, 2D materials, nanoparticles (i.e., under 100 nm), and graphene-related materials provide even more superior performance properties for high-performance impact resistance for ballistics. This research has demonstrated the superiority of basalt fiber-reinforced polymer matrix composite panels over E-Glass fiber-reinforced polymer matrix composite panels providing high-performance impact resistance for ballistics at a competitive cost. Additionally, this research investigates the effects of graphene and graphite nanoparticles on the mechanical properties of basalt and E-Glass panels. The results show that the basalt panels have significantly higher tensile and flexural strength and higher tensile and flexural moduli compared to E-Glass panels with little to no weight penalty. Furthermore, the basalt panels have no irritating surfaces like E-Glass panels which make them much easier to carry and assemble where needed. Embodiments of this invention may be adaptable for large-scale applications without a specific geometry restriction.

Embodiments of the present invention provide composite products such as composite panels that may be multi-functional, light weight, and environmentally friendly. They may be safer to handle and more cost-effective in force protection compared to panels currently in use such as E-Glass panels. The composite products may be constructed via hand lay-up and infused with a thermoset epoxy resin under a low-pressure, closed-mold, reinforced composite molding process such as the VARTM (Vacuum Assisted Resin Transfer Molding) process.

The composite products may include graphene or graphite additives. They may be added as the graphene-related material, 2D material, carbonaceous material, or nanoparticle in the basalt fiber composite products.

According to an aspect the present invention, a composite product comprises basalt fibers, and a liquid polymer resin mixed with a curing agent and infused into the basalt fibers.

In specific embodiments, the composite product may further comprise an additive including at least one of graphene or graphite mixed with the liquid polymer resin and the curing agent and infused into the basalt fibers. The additive may be weighed at about 0.1% to 0.3% of a weight of the liquid polymer resin and curing agent. The additive may include at least one of graphene nanoparticles or graphite nanoparticles. The basalt fibers may be provided as a basalt fibers fabric which is infused with the liquid polymer resin mixed with the curing agent and which is cured to form a composite panel. The liquid polymer resin may comprise at least one of thermoset epoxies or aliphatic amines. The liquid polymer resin may comprise DGEBF, hydrogenated DGEBF, and neopentyl glycol diglycidyl ether, and the curing agent may comprise TETA.

In accordance with another aspect, a method of making a composite product comprises mixing a liquid polymer resin with a curing agent to form a resin matrix; infusing the resin matrix into basalt fibers; and curing the basalt fibers infused with the resin matrix to form the composite product.

In some embodiments, the method may further comprise adding an additive including at least one of graphene or graphite to the liquid polymer resin and the curing agent and mixing the additive with the liquid polymer resin and the curing agent to form the resin matrix which is infused into the basalt fibers. It may further comprise weighing the additive, at about 0.1% to 0.3% of a weight of the liquid polymer resin and curing agent, to be added to the liquid polymer resin and curing agent. The method may further comprise forming a basalt plain weave fabric of the basalt fibers which is infused with the liquid polymer resin mixed with the curing agent; and curing the infused basalt plain weave fabric to form a composite panel. It may further comprise laying up the basalt plain weave fabric by hand which is infused with the liquid polymer resin mixed with the curing agent.

BRIEF DESCRIPTION OF THE DRAWINGS

Embodiments of the invention will become more fully apparent from the following detailed description, the appended claims, and the accompanying drawings in which like reference numerals identify similar or identical elements.

FIG. 1 illustrates an example of the structure and weight percentages of a liquid resin matrix.

FIG. 4 shows fiber properties of basalt fiber (BF) and glass fiber (GF).

FIG. 5 shows manufacturer specifications and current costs of BF and GF.

FIG. 9 shows examples of cut/sized panels.

FIG. 13 shows a summary of Flexural and Tensile results of pure basalt fiber and basalt fiber resin along with the graphene-related additives.

FIG. 14 shows current costs and performance comparison of E-glass and basalt panels.

FIG. 15 shows a summary of additional current costs cost incurred by adding graphite and graphene to basalt and E-glass panels.

DETAILED DESCRIPTION

Figures 2, 3:
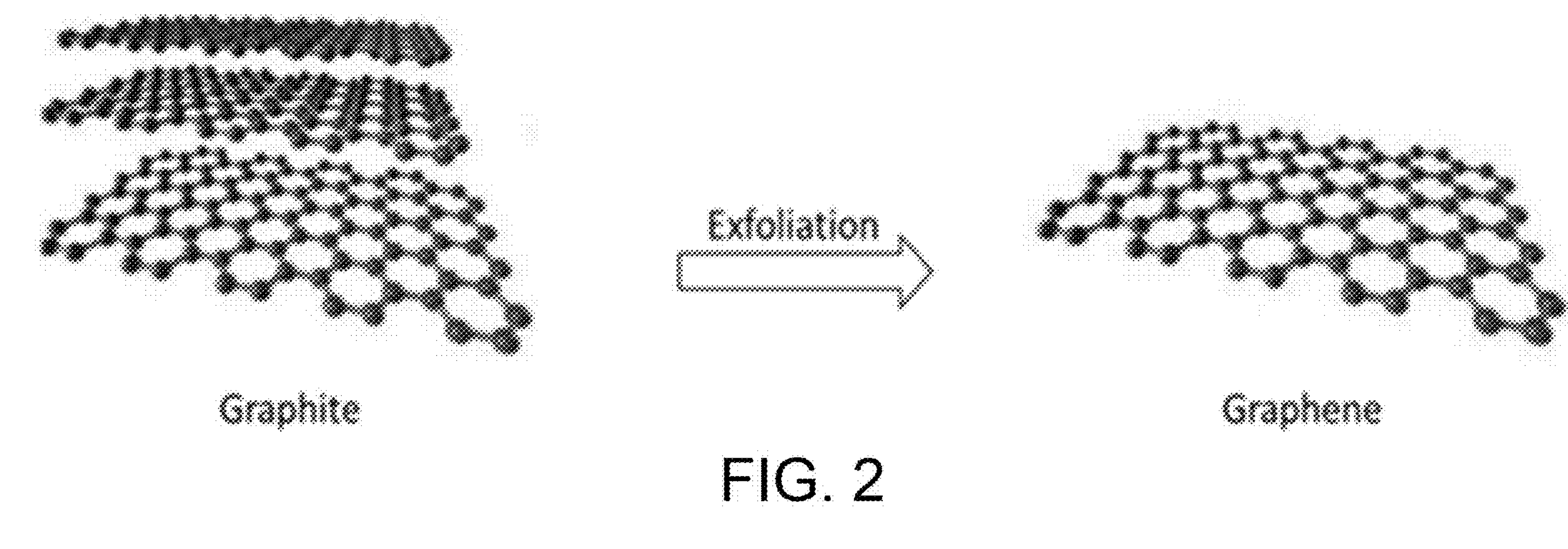
FIG. 2 illustrates an example of the structure of graphite and graphene nanoparticles as additives to the resin matrix.
FIG. 3 shows a description and outline of current costs of the graphene and graphite as additives used in this study.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Embodiments of the present invention provide a composite product including basalt fibers, and a liquid polymer resin mixed with a curing agent and infused into the basalt fibers. A method of making the composite product includes mixing a liquid polymer resin with a curing agent to form a resin matrix; infusing the resin matrix into basalt fibers; and curing the basalt fibers infused with the resin matrix to form the composite product. The method may further include adding an additive including at least one of graphene or graphite to the liquid polymer resin and the curing agent and mixing the additive with them to form the resin matrix which is infused into the basalt fibers.

FIG. 1 illustrates an example of the structure and weight percentages of a liquid resin matrix. It includes a matrix, fibers, and a curing agent. A variety of polymer matrices may be used, including thermoset epoxies and aliphatic amines. The matrix materials used in this research study were selected because they are commercially available and can be easily procured in industrial quantities at a competitive price. Furthermore, their chemical compositions are publicly disclosed (unlike some proprietary resins), well-documented, and well-characterized in existing literature. The composition by weight in the example includes 70% Diglycidal ether of Bisphenol F (DGEBF), 20% Hydrogenated DGEBF), and 10% Neopentyl glycol diglycidyl ether. The monomers have been shown to have good mechanical properties and chemical resistance when properly cured. However, the viscosity of their neat state exceeds the limits of the chosen processing technique. For these epoxies to be used, a series of diluents were evaluated to reduce the uncured matrix viscosity and further modify the mechanical properties of the cured networks. The diluent used in this study was Neopentyl glycol diglycidyl ether as shown in FIG. 1. The curing agent was Triethylenetetramine (TETA).

FIG. 2 illustrates an example of the structure of graphite and graphene nanoparticles as additives to the resin matrix. Different methods have been used to synthesis graphene, but graphite exfoliation is generally considered the simplest way to produce graphene. This research study investigated the use of graphite and graphene as additives in addition to the liquid resin components of the thermoset matrix. Graphite consists of a multi-stack of graphene layers which are held apart by $\pi$-orbitals and Pauli exclusion and held together by weak van der Waals forces. Y. W. Sun, D. G. Papageorgiou, C. J. Humphreys, D. J. Dunstan, P. Puech, J. E. Proctor, C. Bousige, D. Machon, A. San-Miguel, 2021. Mechanical properties of graphene. Appl. Phys. Rev. 8. Graphene owes its special properties to its $sp^2$ hybridized carbon atoms which form a covalent bond, and each carbon atom is connected to three other carbon atoms in its crystal lattice. Carbon atoms in graphene have a unique hexagonal arrangement that facilitate free mobility of electrons across the layers rendering this 2D material capable of carrying electrical charge or heat very effectively. This property gives graphene special mechanical, chemical, thermal, and electrical properties. K. S. Novoselov, A. K. Geim, S. V. Morozoy, D. Jiang, Y. Zhang, S. V. Durunos, I. V. Grigorieva, and A. A. Firsov. 2004. "Electric Field Effect in Atomically Thin Carbon Films." Science 306 (5696): 666-69. https://doi.org/DOI: 10.1126/science.1102896.

FIG. 3 shows a description and outline of cost of the graphene and graphite as additives used in this study. The graphite is a fine black powder, Grade BF-103, from Barite World. The graphene has black nanoplatelets, Grade xGnP®, C-750, from XG Sciences.

For fiber materials, this study selected E-Glass (aka fiberglass, glass fiber, or GF) as a baseline fiber because E-Glass is well-understood in literature, inexpensive, commercially available from many vendors in large quantities, UV stable, relatively moisture-resistant, and commonly used in ballistic applications (typically purchased as "Commercial Off The Shelf" or "COTS" panels).

The study selected basalt fiber (BF) as the material of interest because of its potential to be used for ballistic applications. Basalt fiber (BF), originating from basalt rock, is manufactured from melting finely dust basalt at 1500-1700° C. that turns into a glassy molten liquid extruded in thin fibrous form. Vivek Dhand, Garima Mittal, Kyong Yop Rhee, Soo-Jin Park, David Hui, 2015. A short review on basalt fiber reinforced polymer composites. Compos. Part B Eng. 73, 166-180. Basalt is naturally occurring, relatively inexpensive, non-toxic, highly abundant in nature, and more environmentally friendly to manufacture into fibers than E-Glass. Basalt fibers perform well compared to aramid, carbon, and ultra-high molecular weight polyethylene (UHMWPE) fibers despite being significantly less expensive.

By combining BF with a reinforcing polymer (BFRP), it becomes more cost-effective than a carbon fiber reinforced polymer (CFRP) and ends up with a better strength than a glass fiber reinforced polymer (GFRP). In addition, higher flexural strength and better adhesive properties make BFRP a better candidate than CFRP or GFRP for COTS panel construction. BF finds a number of applications due to its non-hazardous nature compared to other traditional fibers including asbestos/glass fibers. Bocardi, S., Boffa, N. D., Carlomagno, G. M., Del Core, G., Meola, C., Russo, P Simeoli, G. Inline Monitoring of Basalt-Based Composites Under Impact Tests. Composite Structures. 210, 152-158, 2019. BF composites with other geometries overcome mechanical properties compared to glass fiber composites. Mauro H. Lapena and Gerson Marinucci Mechanical Characterization of Basalt and Glass Fiber Epoxy Composite Tube. Materials Research. 21, 1, 2018. Some of the BF's uses include high-temperature applications, acoustic proofing by acting as a barrier to absorb 80-95% of sounds propagating in the frequency of 1,800 Hz, and in agricultural practices.

FIG. 4 shows fiber properties of basalt fiber and glass fiber. As compared to GF, BF has higher tensile strength, high modulus of elasticity, density, and elongation at break.

FIG. 5 shows manufacturer specifications and costs of BF and GF. BF is most costly than GF but not by much, especially in view of its superior fiber properties.

Figure 6:
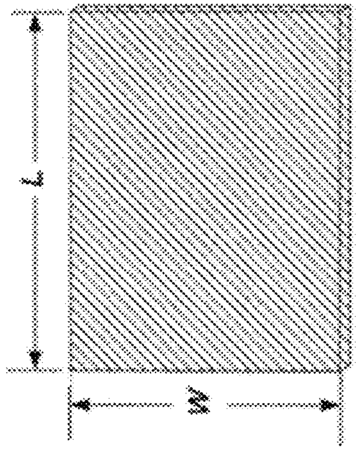
FIG. 6 illustrates an example of a flat panel geometry of a composite product with length L and width W.

FIG. 6 illustrates an example of a flat panel geometry of a composite product with length L and width W. This study chose flat rectangular panels as the desired geometry to be manufactured for a variety of reasons. This geometry is easy to manufacture with the widely available tooling surface (namely, a flat rectangular Aluminum block) and is the standard geometry of ballistic panels which is a primary impetus of this research. Furthermore, the desired mechanical tests for investigating the composites' performance utilize multiple rectangular samples to be cut out of a larger rectangular panel. It is important to note, however, that these high-performance composites can be tailored to a variety of geometries other than simple rectangular prisms. They are only limited by the geometry of the tooling surface and the skill of the composite engineer(s).

Figure 7:
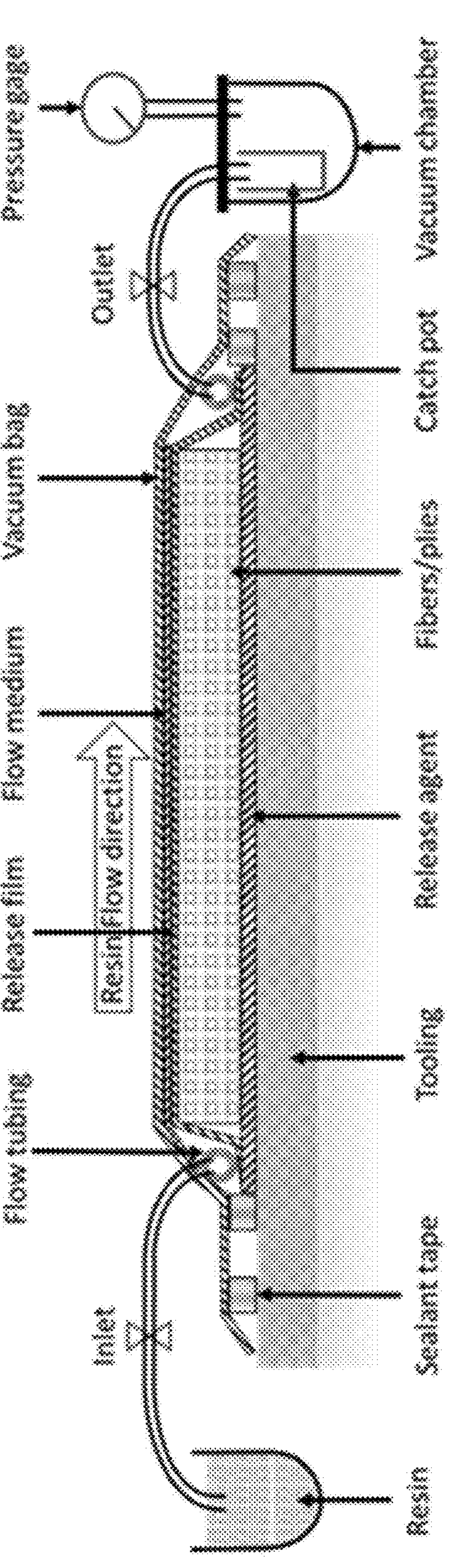
FIG. 7 illustrates an example of a schematic representation of a system for performing the VARTM process.

FIG. 7 illustrates an example of a schematic representation of a system for performing the VARTM process. This study performed manufacturing of the composite panels by hand lay-up which are then infused via the VARTM process. Of course, other manufacturing processes may be used instead. The system provides tooling, with release agent, fibers/piles, and release film. A resin in a container is introduced via an inlet valve to a flow tubing. The resin flows across the release film as a flow medium toward a vacuum bag, through an outlet valve, and into a catch pot disposed in a vacuum chamber monitored using a pressure gage. A sealant tape extends along the resin flow path.

The E-Glass and basalt plain weave fabrics were cut by hand to nominal dimensions of 41-50"×14-16" to a desired thickness of 0.5". All panels were laid-up in [0°/90°] orientation and were balanced and symmetric about the mid-plane. VARTM allows for the fabrication of high-quality, low void content composite parts with a reasonable fiber weight percent of 60-65% at large scale. The liquid resin constituents were poured and weighed into plastic mixing cups that had a nominal volume of two pints. The graphene/graphite nanoparticles were weighed at about 0.1% or 0.3% of the liquid resin weight (plus the weight of the curing agent which is added next) then added to the liquid resin. Once the nanoparticles were added, the curing agent was introduced to the mixture. The total resin matrix was then mixed in an electric mixer at 800 rpm for two minutes then infused into the fibers under vacuum. Once the panels were cured, each panel measured approximately 41-50"×14-16"×½". From each panel, rectangular test coupons and smaller rectangular panels were cut to dimensions of 12"×14"×½" using a waterjet.

Figure 8:
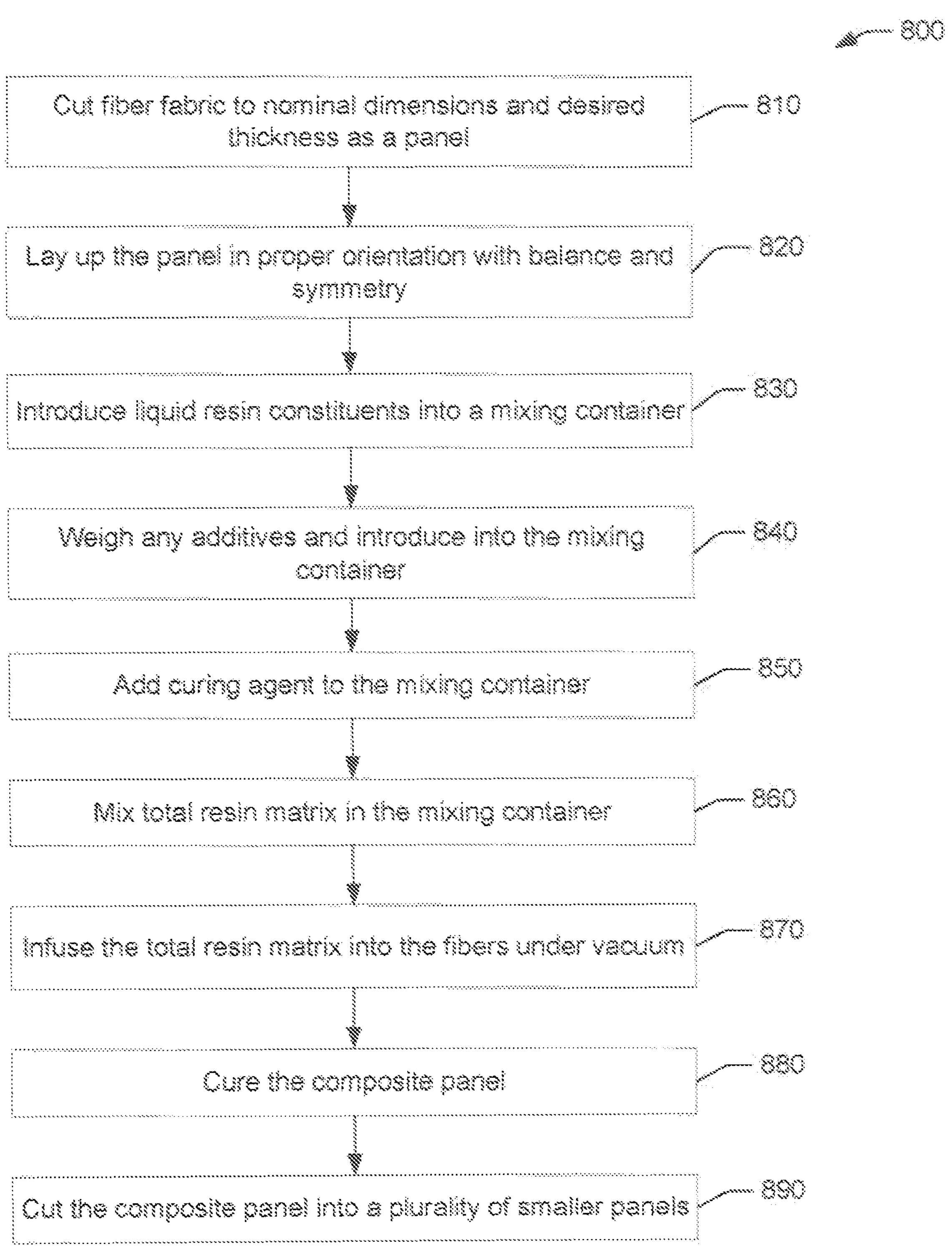
FIG. 8 is a flow diagram illustrating an example of the VARTM process for manufacturing composite panels.

FIG. 8 is a flow diagram 800 illustrating an example of the VARTM process for manufacturing composite panels. The process includes cutting fiber fabric to nominal dimensions and desired thickness as a panel (step 810) and laying up the panel in proper orientation with balance and symmetry (step 820). Liquid resin constituents are introduced into a mixing container (step 830). Any additive (2) may be weighed and introduced into the mixing container (step 840). A curing agent is added to the mixing container (step 850). Next, the process includes mixing the total resin matrix into the fibers (step 860) and infusing the total resin matrix into the fibers under vacuum (step 870). The process cures the composite panel (step 880). The composite panel may be cut into a plurality of smaller panels (step 890).

FIG. 9 shows examples of cut/sized panels. The examples include an E-glass or Basalt cut panel and an E-glass with 0.1% graphene or Basalt with 0.1% graphene cut panel.

The study tested the samples for tensile and flexural properties. Three samples were tested for each material composition for a total of thirty tensile tests. Un-notched tensile testing was conducted in accordance with ASTM D3039 on an Instron 5985 floor test frame equipped with manual grips and a 250 kN load cell. A video extensometer was used to measure the strain values for the determination of the Young's modulus.

Additionally, the study performed three-point bend testing of the composite samples to obtain flexural modulus and ultimate flexural strength. Five samples were tested for each composition type for a total of fifty flexural tests. Tests were conducted on an Instron electromechanical test frame equipped with a 10 kN load cell. Flexural tests were conducted in accordance with ASTM D7264. Samples were slightly longer than the recommended 32 times sample thickness measuring 6"×½"×⅛" to prevent slippage in the test frame. Three-point bend tests done to ascertain flexural modulus and ultimate flexural strength. Tests were performed on an Instron test device according to ASTM D7264.

Figure 10:
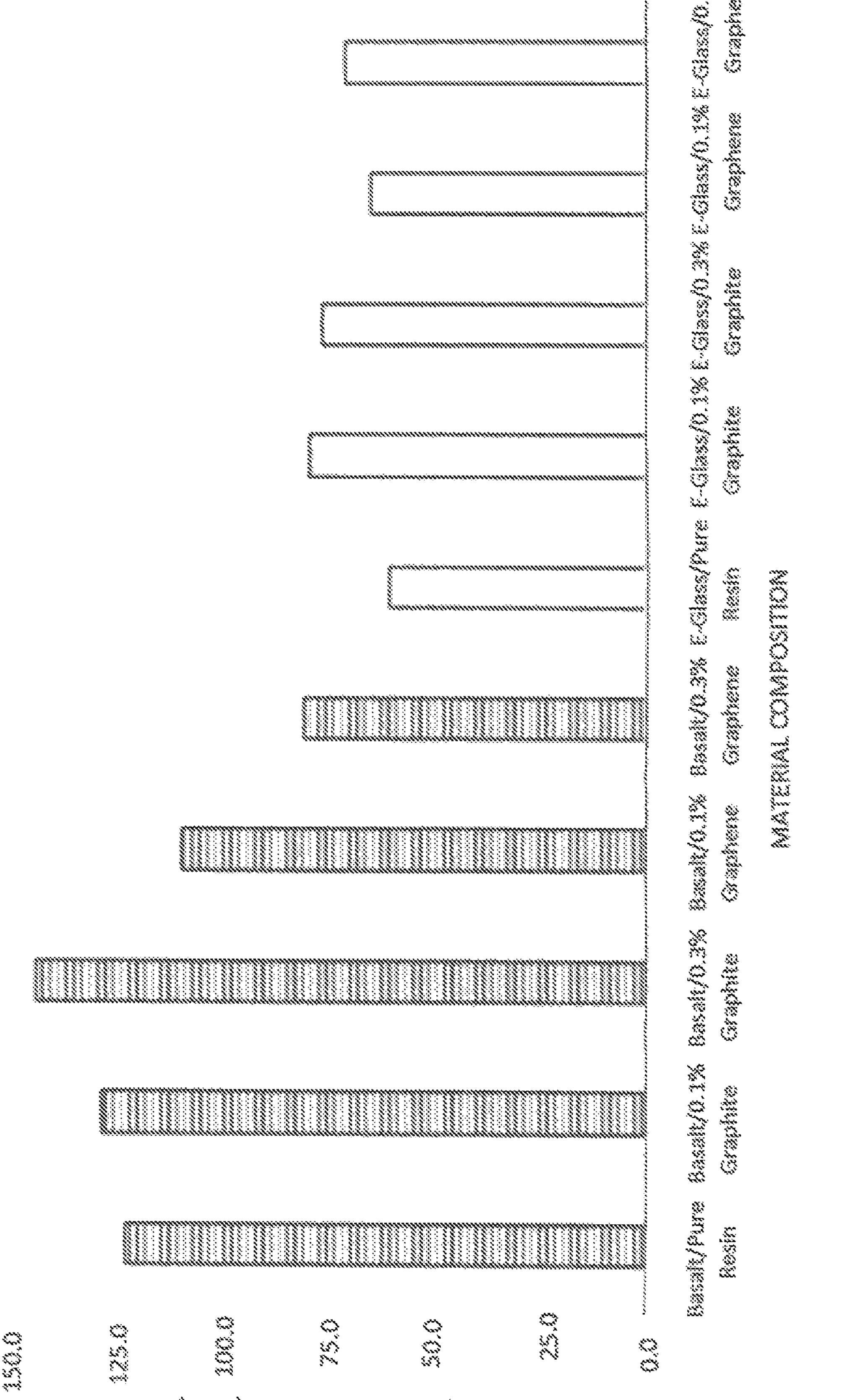
FIG. 10 shows a summary of the Ultimate Flexural Strength (a.k.a. UFS or Flexure Stress at Break) of the test samples having BF and test samples having GF in the presence of graphene and graphite.

FIG. 10 shows a summary of the Ultimate Flexural Strength (a.k.a. UFS or Flexure Stress at Break) of the test samples having BF and test samples having GF in the presence of graphene and graphite. The addition of 0.1% and 0.3% Graphite increases the UFS by 4% and 17%, respectively, in the basalt composites and 31% and 26%, respectively, in the E-Glass composites. However, the addition of 0.1% and 0.3% Graphene decreases the UFS by 11% and 34%, respectively, in the basalt composites but increases the UFS by 7% and 17%, respectively, in the E-Glass composites.

Figure 11:
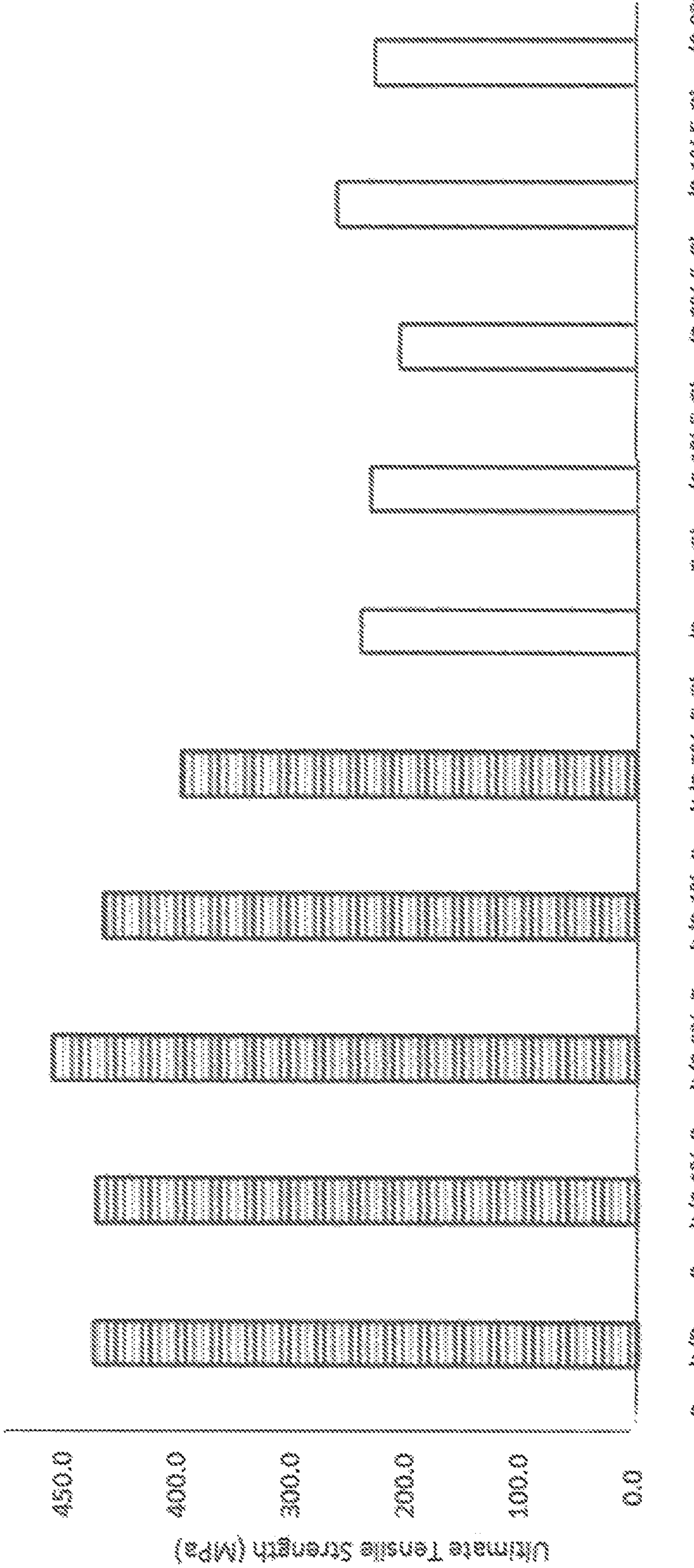
FIG. 11 shows a summary of the Ultimate Tensile Strength (UTS) of the test samples having BF and test samples having GF in the presence of graphene and graphite.

FIG. 11 shows a summary of the Ultimate Tensile Strength (UTS) of the test samples having BF and test samples having GF in the presence of graphene and graphite. For the basalt composites, the addition of 0.1% Graphite decreases the UTS by 1% whereas the addition of 0.3% Graphite increases the UTS by 7%. For the E-Glass composites, the addition of 0.1% and 0.3% Graphite decreases the UTS by 4% and 15%, respectively. The addition of 0.1% and 0.3% Graphene decreases the UTS by 2% and 16%, respectively, in the basalt composites. For the E-Glass composites, however, the addition of 0.1% Graphene increases the UTS by 8% whereas the addition of 0.3% Graphene decreases the UTS by 6%.

Figure 12:
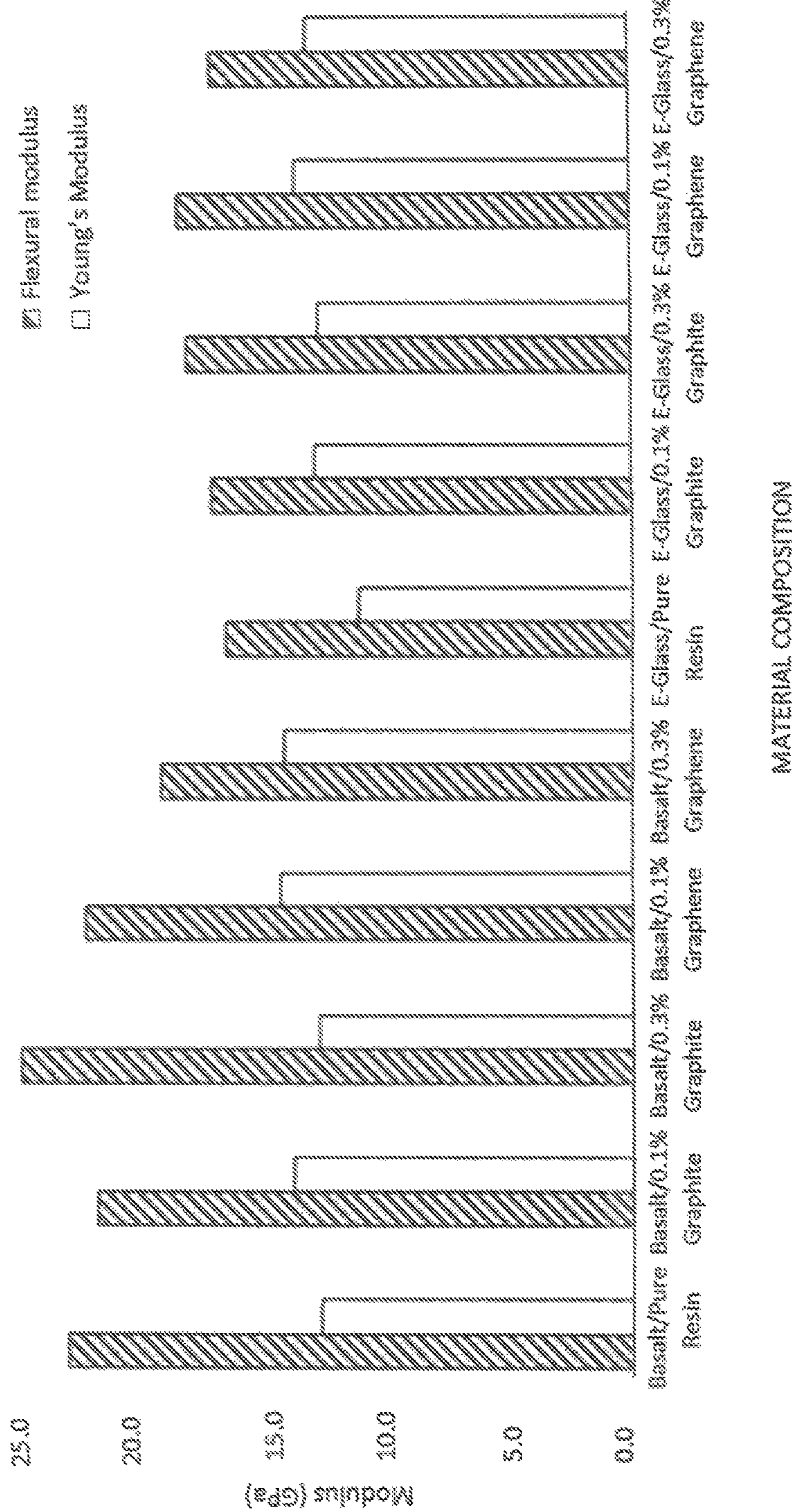
FIG. 12 shows a summary of the Flexural and Young's moduli of the test samples having BF and test samples having GF in the presence of graphene and graphite.

FIG. 12 shows a summary of the Flexural and Young's moduli of the test samples having BF and test samples having GF in the presence of graphene and graphite. The addition of the 0.1% and 0.3% Graphite and Graphene nanoparticles increases Young's modulus in both the basalt and E-Glass composites by 0.4-23%. Additionally, the addition of the nanoparticles shows an increase in Flexural Modulus in the E-Glass composites and a mixed response in the basalt composites. An increase in Young's and Flexural moduli indicates that the additives make the composites stiffer, i.e., the elastic strain resulting from a given applied stress is smaller. The addition of the Graphite nanoparticles appears to make the basalt and E-Glass composites stiffer across the board. Conversely, the addition of the Graphene nanoparticles varies: stiffer in the E-Glass and mixed in the basalt.

FIG. 13 shows a summary of Flexural and Tensile results of pure basalt fiber and basalt fiber resin along with the graphene-related additives in. The table shows tensile and flexural results with and without additives, along with relative percent changes compared to no additives. Overall, the graphite and graphene additives tend to increase the UFS and the Young's modulus. There is not a clear winner in terms of which additive is best: the graphite appears to be the superior additive for increasing UFS whereas the graphene appears to be the superior additive for increasing Young's modulus. Both properties are important for ballistic applications. Furthermore, the increase in mechanical properties appears to be dose-dependent: any marginal increase of additives beyond a certain threshold appears to reverse the beneficial effects. It is clear that a very small percent of additive generally leads to noticeable benefits. This unexpected result leads to a recommended weight % of the additive of about 0.1% to 0.3% of the liquid resin weight plus the weight of the curing agent. The weight % range of about 0.1% to 0.3% is considered a critical range to achieve the unexpected result. The weight % may be 0.09% to 0.33% when considering a ±10% at end points of the approximate range of about 0.1% to 0.3%.

FIG. 14 shows costs and performance comparison of E-glass and basalt panels in. It summarizes the comparison between E-Glass and basalt fibers in terms of cost by weight and average performance. Basalt fiber is a low cost alternative to glass fiber. Recall from the table in FIG. 5 that the cost by weight of the E-Glass fabric is \$21.35/lb whereas the cost of the basalt fabric is \$25.96/lb. Likewise, the average UTS of all the GFRP composite samples is 200.4 MPa whereas the average UTS of all the BFRP composite samples is 400.1 MPa. Thus, to switch from E-Glass fiber to basalt fiber only costs an additional \$4.61/lb (or 21.6% more) but results in a 7% increase in Young's modulus, a 28% increase in flexural modulus, a 67% increase in UFS, and nearly a 100% increase in UTS performance as seen in FIG. 14. These results demonstrate the potential of BF as an attractive replacement reinforcing fiber to GF.

FIG. 15 shows a summary of additional cost incurred by adding graphite and graphene to basalt and E-glass panels in. Graphite and graphene additives show potential as low-cost performance enhancers. Recall from the table in FIG. 13 that the addition of graphite to basalt and E-glass panels led to a 4%-31% increase in UFS. Similarly, the addition of the graphene to the basalt and E-glass panels led to an 11%-23% increase in Young's modulus. FIG. 15 shows the estimated cost by area and weight of adding graphite and graphene to basalt and E-glass panels. From the table, it costs an additional \$0.003-0.011/lb (\$0.022-0.078/$ft^2$) to add 0.1%-0.3% graphite, and \$0.135-0.452/lb (\$0.883-3.117/$ft^2$) to add 0.1%-0.3% graphene.

For comparison, a typical ½"-thick fiberglass/epoxy bulletproof COTS panel batch-produced from private industry costs approximately \$5.93/lb or \$29.66/$ft^2$ (Source: Total Security Solutions). When comparing costs, one should keep in mind that the COTS panels produced in private industry are batch-produced in large quantities and achieve the economies-of-scale of mass production (i.e., lower cost per panel) whereas the panels produced in this study are made one-at-a-time in a laboratory. Even so, the graphene and graphite additives show potential to achieve significant performance gains for a small additional cost without a weight penalty that is typical with other performance-enhancing additives.

Basalt fiber is less harmful to health and the environment. In contrast, the fine filaments in E-glass fabrics are known skin irritants which make them inconvenient to handle. Furthermore, aerosolized glass particles that are produced during processing are well-known respiratory hazards (silicosis). Basalt fibers are much less irritating to skin and less of a respiratory hazard. Moreover, compared to fiberglass and similar fibers, basalt is considered more environmentally friendly due to its natural origin. Part of the process of manufacturing high-quality glass fibers involves introducing ingredients such as aluminum and other minerals necessary to create the desired chemical and physical properties of the final product. Additional steps and ingredients will always increase production cost. Since basalt already contains these ingredients naturally, these steps are eliminated from the manufacturing process. There are also reports that being a product of volcanic activity, the fiberization process is environmentally safer than that of glass fiber.

Embodiments of the invention can be manifest in the form of methods and apparatuses for practicing those methods.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A composite product comprising:

basalt fibers; and a liquid polymer resin mixed with a curing agent and infused into the basalt fibers;

wherein the liquid polymer resin comprises DGEBF, hydrogenated DGEBF, and neopentyl glycol diglycidyl ether, and the curing agent comprises TETA.

2. The composite product of claim 1, further comprising:

an additive including at least one of graphene or graphite mixed with the liquid polymer resin and the curing agent and infused into the basalt fibers.

3. The composite product of claim 2, wherein the additive is weighed at about 0.1% to 0.3% of a weight of the liquid polymer resin and curing agent.

4. The composite product of claim 2, wherein the additive includes at least one of graphene nanoparticles or graphite nanoparticles.

5. The composite product of claim 1, wherein the basalt fibers are provided as a basalt fibers fabric which is infused with the liquid polymer resin mixed with the curing agent and cured to form a composite panel.

6. A composite product made by a method comprising:

mixing a liquid polymer resin with a curing agent to form a resin matrix;

infusing the resin matrix into basalt fibers; and curing the basalt fibers infused with the resin matrix to form the composite product;

wherein the liquid polymer resin comprises DGEBF, hydrogenated DGEBF, and neopentyl glycol diglycidyl ether, and the curing agent comprises TETA.

7. The composite product of claim 6, wherein the method further comprises:

adding an additive including at least one of graphene or graphite to the liquid polymer resin and the curing agent; and mixing the additive with the liquid polymer resin and the curing agent to form the resin matrix which is infused into the basalt fibers.

8. The composite product of claim 7, wherein the method further comprises:

weighing the additive, at about 0.1% to 0.3% of a weight of the liquid polymer resin and curing agent, to be added to the liquid polymer resin and curing agent.

9. The composite product of claim 7, wherein the additive includes at least one of graphene nanoparticles or graphite nanoparticles.

10. The composite product of claim 6, wherein the method further comprises:

forming a basalt plain weave fabric of the basalt fibers which is infused with the liquid polymer resin mixed with the curing agent; and curing the infused basalt plain weave fabric to form a composite panel.

11. The composite product of claim 10, wherein the method further comprises:

laying up the basalt plain weave fabric by hand which is infused with the liquid polymer resin mixed with the curing agent.

12. The composite product of claim 6, wherein the method further comprises:

weighing an additive, at about 0.1% to 0.3% of a weight of the liquid polymer resin and curing agent, to be added to the liquid polymer resin and curing agent, the additive including at least one of graphene or graphite; and mixing the additive with the liquid polymer resin and the curing agent to form the resin matrix which is infused into the basalt fibers.

13. The composite product of claim 12, wherein the additive includes at least one of graphene nanoparticles or graphite nanoparticles.

14. The composite product of claim 12, wherein the method further comprises:

laying up a basalt plain weave fabric of the basalt fibers by hand which is infused with the liquid polymer resin mixed with the curing agent; and curing the infused basalt plain weave fabric to form a composite panel.

* * * * *